Aug. 4, 1931.    L. G. COPEMAN    1,817,544
SHARP FREEZING CONTAINER
Filed Aug. 20, 1928    2 Sheets-Sheet 1

INVENTOR.
Lloyd G. Copeman
BY
ATTORNEY.

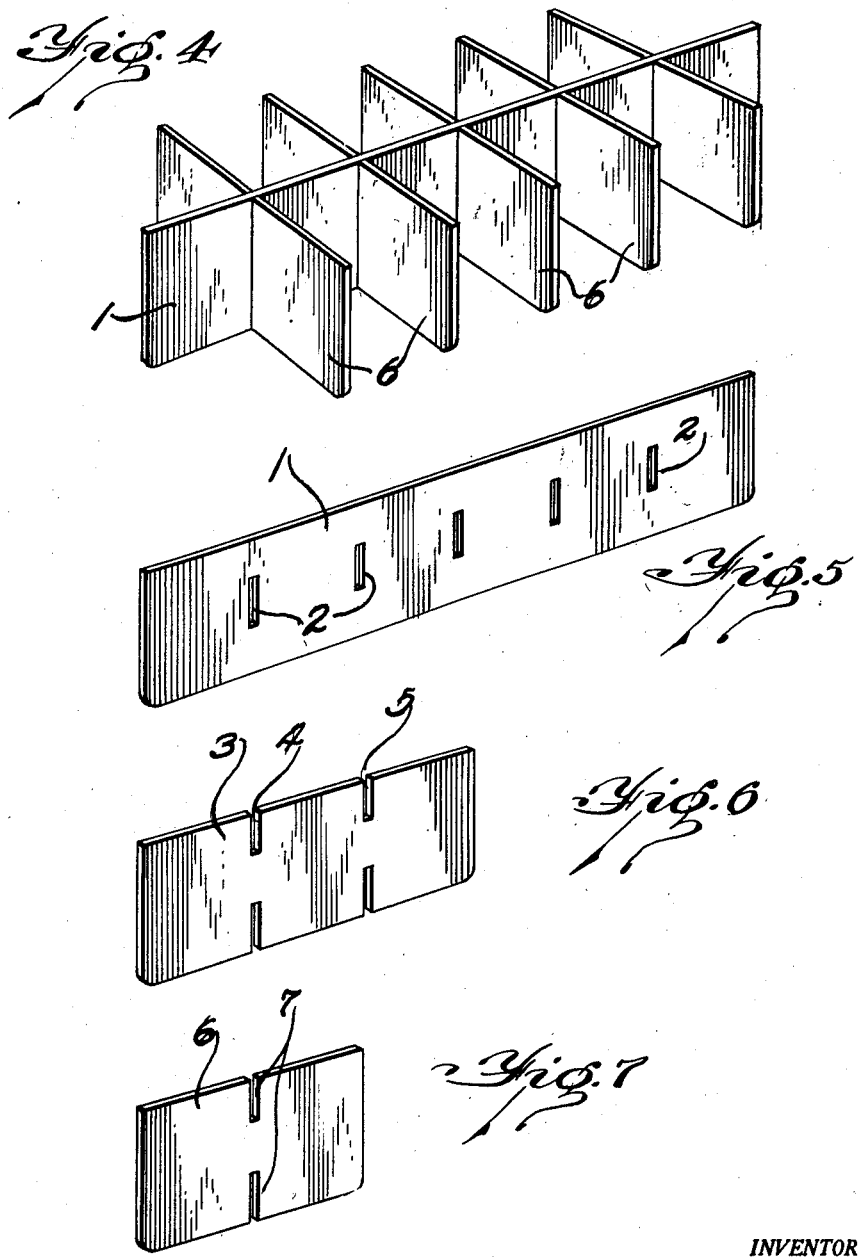

Patented Aug. 4, 1931

1,817,544

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

SHARP FREEZING CONTAINER

Application filed August 20, 1928. Serial No. 300,713.

This invention relates to a sharp freezing container and method of forming same. It has to do particularly with ice-cube trays such as are used in domestic refrigerating units, and more particularly with the grid or partitions of said trays which define the ice-cube chambers.

As is well known, it is a very difficult and messy operation to remove ice-cubes from metallic ice-cube trays. Attempts have been made to solve this problem, and in my Patent No. 1,675,599 of July 3, 1928 I have disclosed a sharp freezing container formed of flexible material, preferably rubber.

The present invention relates specifically to the grid structure of a sharp freezing container. In the preferred embodiment of this invention the grids or partitions are preferably completely separate from the outer container and said grids or partitions are preferably formed of flat rubber or similar flexible stock.

The formation of a molded grid structure, such as shown in my prior patent, above mentioned, would be practically as expensive an operation as the forming of the complete tray; that is, the integral partitions and the outside defining walls. In order to overcome this objection I have conceived a method of fabricating and assembling the grid structure from flat stock.

In carrying out this method I prefer to take flat strips of rubber, preferably relatively thin, and so fabricate these strips of rubber (which are, of course, cut to length) so that the different strips of rubber may be easily interfitted together to form a complete grid structure adapted to be placed as a unit in the outer supporting container.

In the drawings:

Fig. 4 is a view similar to Fig. 3, but illustrating the invention as embodied in a double row of trays instead of a triple row of trays.

Fig. 5 is a detail perspective view of a single strip of rubber for forming a lengthwise strip or strips of the grid and illustrating the preferred manner of fabricating the same.

Fig. 6 is a perspective view of a transverse strip of rubber and slotted so as to cooperate with the punched holes in the lengthwise strips of rubber.

Fig. 7 is a perspective view similar to Fig. 6, illustrating a type of transverse strips adapted to be used in such grids as shown in Fig. 4.

Figure 1:
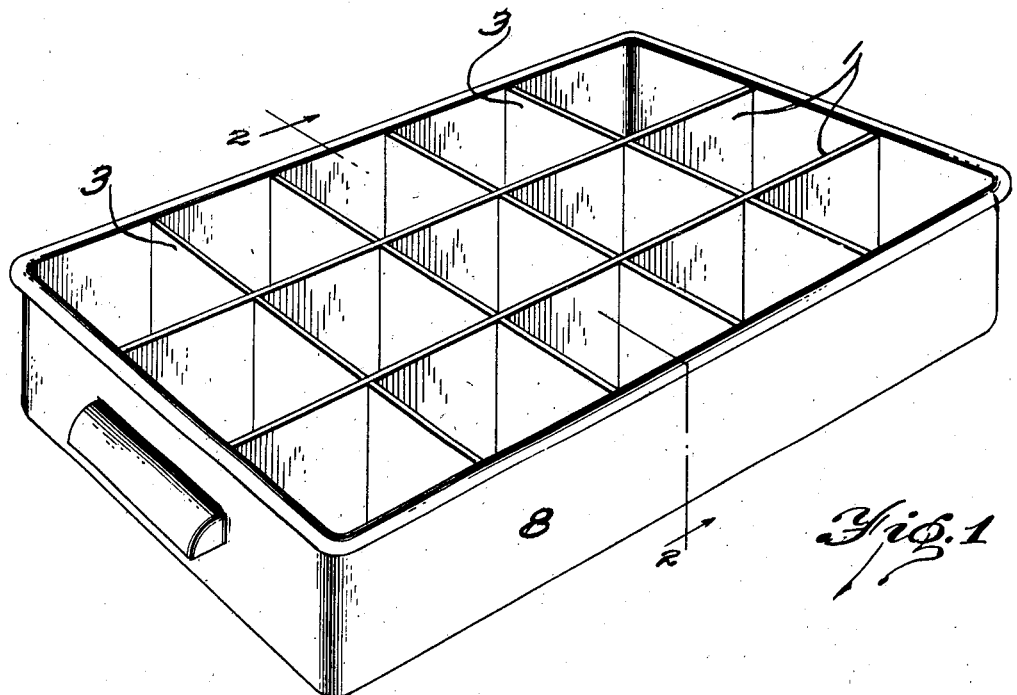
Fig. 1 is a perspective view of an ice-cube tray formed in accordance with the present invention.

While the rubber tray as shown in my Patent No. 1,675,599 completely solves the problem of ice-cube removal, it is open to objection in that it requires a slightly longer time to freeze the ice cubes than in the standard metal container. It is the object of the present invention to make use of the rubber to permit easy removal of the ice cubes and to at the same time take advantage of metal as a good conductor whereby to assist or accelerate the freezing of the ice cubes. To accomplish this I preferably form the container or outside member of metal and form the grid or inner partitions of rubber or other material to which water does not readily adhere.

To overcome the expensive operation of molding a separate grid structure I preferably form such grid structure of independent but readily assembled strips.

The invention may be best understood by first describing the method of assembly. As is shown in Fig. 5, I preferably take a flat strip of standard rubber 1, relatively thin, and stamp out suitable apertures 2 therein, said apertures preferably being rectangular and extending transversely of the strip 1.

I then take a plurality of transverse strips of rubber 3 and cut out suitable notches 4 and 5 therein, depending upon the width of said transverse strips 3 and the number of rows of ice-cube chambers to be formed.

For forming two rows of ice-cube chambers of course it will be necessary to have a very small transverse strip 6 such as is shown in Fig. 7, and a single set of slots 7. In this case also it is only necessary to have a single longitudinal strip of rubber 1.

Figure 3:
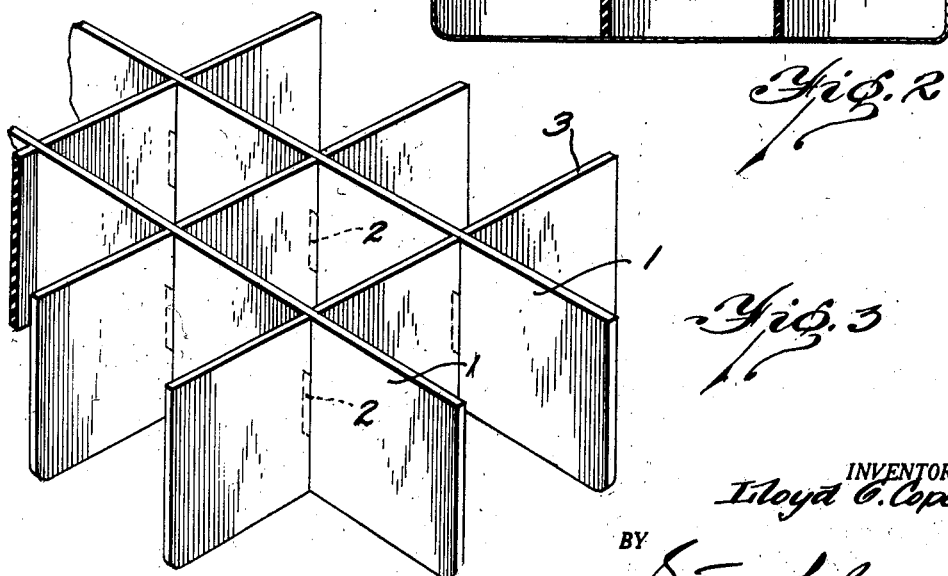
Fig. 3 is a fragmentary perspective view of the assembled tray as removed from its container.

After punching or otherwise fabricating these flat strips of stock, the transverse strips or partitions are preferably distorted so as to be inserted through the apertures 2 in the longitudinal strip or strips. To accomplish this it is only necessary of course to distort one end of the transverse strip or strips. For instance, if the grid such as shown in Fig. 3, is to be formed, one end of the strip 3, from the transverse slot 5 outwardly, may be distorted or folded upon itself so as to be insertable through one of the apertures 2 in the strip 1, when, of course, the distorted portion may be released and allowed to move to normal position whereby the strip 3 will be held in assembled relation with reference to the strip 1. This same procedure, of course, may be followed with reference to the other end of the strip 3 so that the entire grid structure may be built up by successively inserting the transverse strips into assembled relation with the fabricated longitudinal strips.

When all the transverse strips have been assembled it will be obvious that a unitary grid structure is formed, all of the partitions or walls of which are preferably flexible and even elastic, and that when so assembled the method of assembly acts to reinforce and form a unitary grid structure so that it may be easily inserted in place within its container. This is particularly so in grids having a plurality of longitudinal strips.

Figure 2:
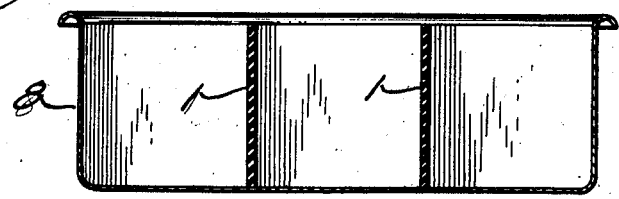
Fig. 2 is a sectional view taken on line 2—2 of Fig. 1.

The grids assembled by this novel method are preferably adapted to be positioned within the containers which of course correspond to the size of the particular grid. These containers are preferably formed of metal such as is shown at 8 in Figs. 1 and 2, whereby to effect rapid transmission of the heat units between the lowside of the refrigerating system and the liquid within the container unit. The removal of the grid and frozen cubes of ice from the main container is a fairly simple matter and when the grid with its solid cubes of ice is once removed it is only a matter of quickly snapping or pushing the ice cubes from the grid structure, thus completely eliminating all the melting effect which has heretofore been necessary in the removing of ice cubes from metal grids.

It will thus be seen that I have not only provided a novel grid structure for sharp freezing containers, but have conceived of a novel method of fabricating and assembling the same whereby such grid structure may be very quickly and cheaply fabricated and assembled from flat rubber strip stock, which of course can be purchased very cheaply. Furthermore, the grade of rubber required may be much inferior to the grade required when the entire tray is molded from rubber, as if the entire trays were molded from rubber any discoloration of the outer wall of the tray would be objectionable. In the present case, however, there would be no objection to the discoloration in the grid and furthermore it would be possible to use even black or any other color of rubber.

What I claim is:

1. A sharp freezing container of a type adapted to be positioned in heat-conducting relation with the lowside of a mechanical refrigerating system, comprising a container formed of metal, and a removable unitary grid structure formed of non-metallic flexible material and adapted to be positioned within said metallic container.

2. A grid structure for sharp freezing containers, comprising a plurality of interconnected partitions formed of flat strips of rubber, said partitions or flat strips being removable but normally so connected as to form a unitary grid structure.

3. A grid structure for sharp freezing containers, comprising a plurality of partitions formed of flat strips of rubber, at least one of said partitions having an aperture therein, and another of said partitions having a pair of spaced slots therein, a portion of the latter partition engaging the former partition in the said aperture, and the former partition engaging the latter partition in the said slots to interconnect the said partitions.

In testimony whereof I affix my signature.

LLOYD G. COPEMAN.